US011611627B2

(12) United States Patent
Totale et al.

(10) Patent No.: US 11,611,627 B2
(45) Date of Patent: *Mar. 21, 2023

(54) ACTION FLOW FRAGMENT MANAGEMENT

(71) Applicant: Open Text Corporation, Waterloo (CA)

(72) Inventors: Sachin Gopaldas Totale, Pleasanton, CA (US); Deepak Michael, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,028

(22) Filed: Sep. 8, 2021

(65) Prior Publication Data

US 2021/0409500 A1    Dec. 30, 2021

Related U.S. Application Data

(63) Continuation of application No. 16/909,364, filed on Jun. 23, 2020, now Pat. No. 11,128,721, which is a continuation of application No. 16/228,186, filed on Dec. 20, 2018, now Pat. No. 10,708,365, which is a continuation of application No. 14/841,146, filed on Aug. 31, 2015, now Pat. No. 10,182,122.

(51) Int. Cl.
*H04L 67/51*    (2022.01)
*H04L 67/10*    (2022.01)
*H04L 67/02*    (2022.01)
*H04L 67/01*    (2022.01)

(52) U.S. Cl.
CPC .............. *H04L 67/51* (2022.05); *H04L 67/02* (2013.01); *H04L 67/10* (2013.01); *H04L 67/01* (2022.05)

(58) Field of Classification Search
CPC ......... H04L 67/51; H04L 67/02; H04L 67/10; H04L 67/01; G06F 8/22; G06F 8/4452; G06F 8/60
See application file for complete search history.

(56) References Cited

U.S. PATENT DOCUMENTS

| 6,742,045 B1 * | 5/2004 | Albert ..................... H04L 69/16 370/236 |
| 8,161,472 B2 | 4/2012 | Hayton et al. |
| 9,027,144 B1 | 5/2015 | Roustant |
| 9,098,497 B1 | 8/2015 | Brette |

(Continued)

OTHER PUBLICATIONS

"Getting Started with xCP 2.0," EMC Corporation, XCP2.0 Self-Paced Tutorial, Dec. 2012, 207 pgs.

(Continued)

*Primary Examiner* — Michael Won
(74) *Attorney, Agent, or Firm* — Sprinkle IP Law Group

(57) ABSTRACT

Action flow fragment management includes executing a parent action flow including multiple steps. At least two steps are distinct pages of a web application. During execution of the parent action flow, an action flow fragment expression is obtained and executed using data gathered from a data source to obtain an action flow fragment identifier. An action flow fragment corresponding to the action flow fragment identifier is selected and executed. When execution of the action flow fragment completes, execution of the parent action flow continues.

18 Claims, 7 Drawing Sheets

(56) References Cited

U.S. PATENT DOCUMENTS

| | | | |
|---|---|---|---|
| 9,158,893 B2* | 10/2015 | Call | H04L 67/01 |
| 9,170,786 B1 | 10/2015 | Totale et al. | |
| 9,405,514 B1* | 8/2016 | Totale | G06F 8/36 |
| 10,182,122 B2 | 1/2019 | Totale et al. | |
| 10,693,770 B2* | 6/2020 | Moisand | H04L 67/142 |
| 10,708,365 B2 | 7/2020 | Totale | |
| 2004/0199572 A1 | 10/2004 | Hunt | |
| 2004/0205179 A1 | 10/2004 | Hunt | |
| 2008/0163193 A1 | 7/2008 | Hayton et al. | |
| 2008/0172622 A1 | 7/2008 | Roche | |
| 2011/0016356 A1 | 1/2011 | Artzi et al. | |
| 2012/0185821 A1 | 7/2012 | Yaseen et al. | |
| 2013/0018944 A1 | 1/2013 | Shyamsunder et al. | |
| 2015/0277882 A1 | 10/2015 | Pongracz et al. | |
| 2016/0078144 A1 | 3/2016 | Claycomb et al. | |
| 2018/0324051 A1 | 11/2018 | Dias | |
| 2020/0389530 A1 | 12/2020 | Totale | |

OTHER PUBLICATIONS

"EMC Documentum xCP Designer Help Version 2.0 User Guide," EMC Corporation, 2012, 325 pgs.

"EMC Documentum xCelerated Composition Platform Designer Help," Version 2.1 User Guide, EMC Corporation, 2009-2014, 373 pgs.

"EMC Documentum xCelerated Composition Platform," Version 2.1 Developer Guide, EMC Corporation, 2009-2014, 82 pgs.

Office Action for U.S. Appl. No. 14/841,164 dated May 3, 2017, 20 pgs.

Office Action for U.S. Appl. No. 14/841,164 dated Nov. 14, 2017, 22 pgs.

Office Action for U.S. Appl. No. 16/228,186 dated Sep. 17, 2019, 12 pgs.

Notice of Allowance for U.S. Appl. No. 16/909,364, dated May 20, 2021, 10 pgs.

* cited by examiner

ACTION FLOW FRAGMENT MANAGEMENT

CROSS-REFERENCE TO RELATED APPLICATION

This application is a continuation of, and claims a benefit of priority under 35 U.S.C. 120 of the filing date of U.S. patent application Ser. No. 16/909,364 filed Jun. 23, 2020, issued as U.S. Pat. No. 11,128,721, entitled "ACTION FLOW FRAGMENT MANAGEMENT", which is a continuation of, and claims a benefit of priority under 35 U.S.C. 120 of the filing date of U.S. patent application Ser. No. 16/228,186 filed Dec. 20, 2018, issued as U.S. Pat. No. 10,708,365, entitled "ACTION FLOW FRAGMENT MANAGEMENT", which is a continuation of, and claims a benefit of priority under 35 U.S.C. 120 of the filing date of U.S. patent application Ser. No. 14/841,146 filed Aug. 31, 2015, issued as U.S. Pat. No. 10,182,122, entitled "ACTION FLOW FRAGMENT MANAGEMENT" the entire contents of all of which are hereby expressly incorporated by reference for all purposes.

BACKGROUND

A web application is a software application that executes in a web browser. The web application may include one or more features, such as graphical user interface widgets, processes, and other aspects of the web application. Web applications may have action flows. Each action flow may be a series of steps, where each step may be dependent on execution of prior steps.

DETAILED DESCRIPTION

Figure 1:
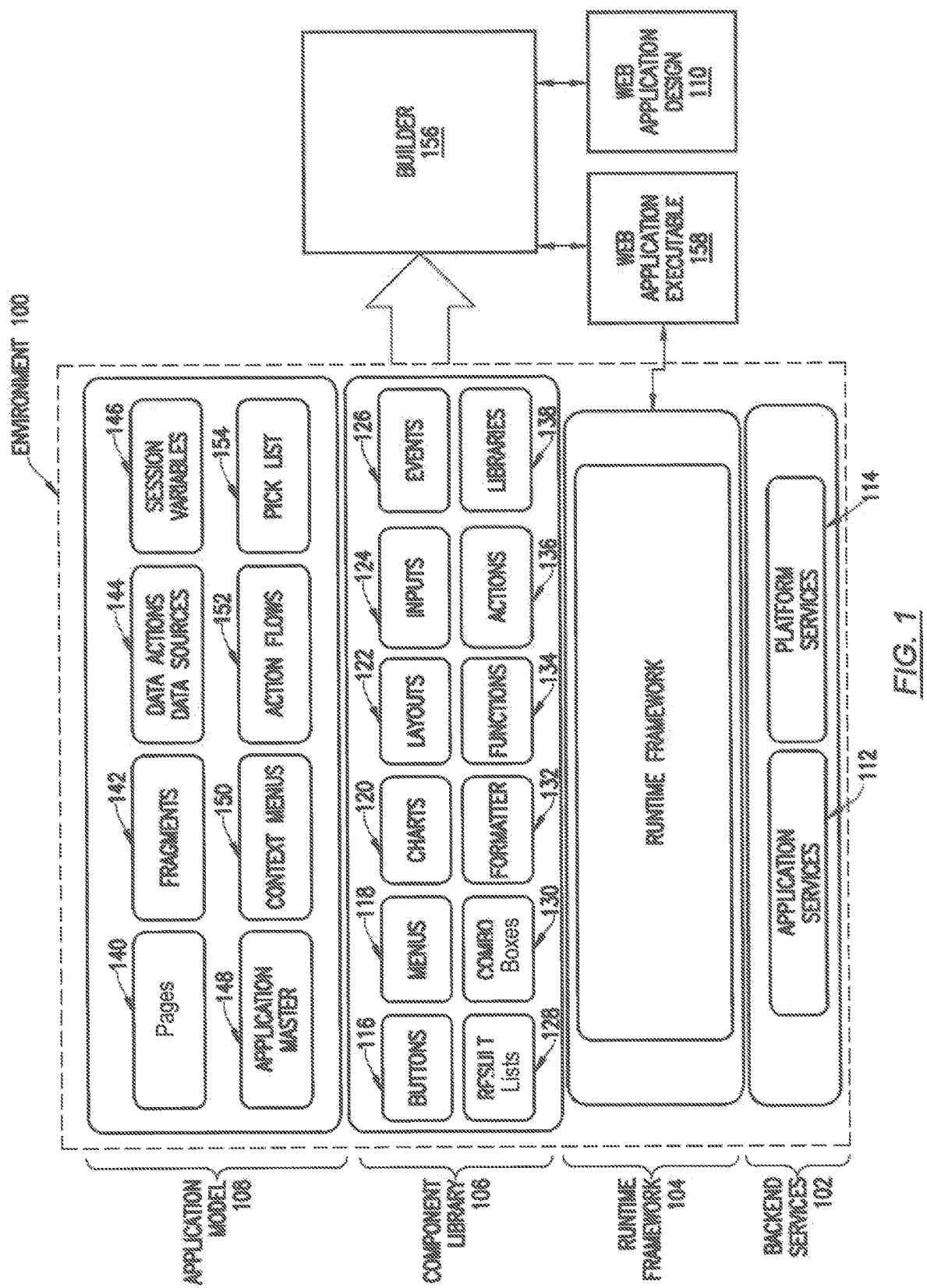
FIGS. 1, 2, and 3 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments are directed to action flow fragment management. In particular, one or more embodiments of the technology provide for portions of action flows to be reused in other action flows. Each action flow may include a set of steps for performing a user level action. An action flow fragment is a subset of a set of steps, that may be incorporated into other action flows at runtime. When a parent action flow is executed, the parent action flow may include an action flow fragment expression. Execution of the action flow fragment expression identifies a target action flow fragment. Thus, execution proceeds by executing the target action flow fragment before returning execution to the parent.

FIG. 1 shows a schematic diagram of a system in accordance with one or more embodiments of the technology. Specifically, FIG. 1 shows a schematic diagram of an environment (100) for developing and executing a web application that implements the process fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface components and processing components.

In one or more embodiments of the technology, user interface components are components that are displayed to an end user. In other words, instances of the user interface components are displayed on a display device. In one or more embodiments of the technology, the user interface components may include, but are not limited to, buttons (116) (e.g., radio buttons, common buttons), menus (118) (e.g., drop down menu, check boxes), charts (120), layouts (122), inputs (e.g., fields) (124) and combo boxes (130). User interface components in the component library may each be associated with a set of options. The set of options define the execution of the user interface component. Namely, the set of options define how a particular instance of the component is executed. Options associated with the user interface components may include formatting, any text that is displayed, any action that is to be performed when the user interface component is selected, other options, and/or any combination thereof. The action may be to: perform an operation on the page, transition to a specific static page, evaluate an expression to determine the page for transitioning, and/or perform another operation.

In one or more embodiments of the technology, the expression may specify one or more data sources and operations to perform on the data from one or more data sources. A data source is a location of data that is not within the expression. For example, the data source may be another portion of the application page or a data repository. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components is discussed below.

Formatter (132) are instructions which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility, and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes pages (140), fragments (142), data actions and data sources (144), session variables (146), application master (148), context menus (150), action flows (152), and a pick list (154). Each of these components of the application model is described below.

A page (140) in the application model (108) is a template for a web page. In other words, a page in the application model (108) is a template for a complete and individual document that is displayable to the end user. A fragment (142) represents at least a portion of an activity. In other words, an activity is a defined sequence of actions that an end user may perform using the web application. A fragment is a portion of the defined sequence of actions. Data actions and data sources (144) define the storage structure and storage location of the data and the actions to perform on the data.

Fragments (142) may include a process fragment. A process fragment is a portion of a process. In other words, a process fragment may have more than one defined input control point and more than one defined output control point. The environment (100) includes functionality to allow a developer to drag a template for the fragment (142) from the application model (108) into the web application design (110) using the builder (156), and insert parameters into the template in order to create a process fragment definition. In other words, a process fragment definition is source code that defines a process fragment using templates and an expression based language rather than a programming language in accordance with one or more embodiments of the technology. The process fragment is described in additional detail below and in FIG. 3.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. For example, the context may be a particular user interface component that is selected, the page that is displayed, or another context. The context menu presents options that are specific to the particular context. The manner of selecting the context menu is not dependent on the context. Specifically, an end user may select the context menu in the same way and have different menu options presented based on the context.

Action flows (152) are sets of steps that are performed. In other words, each action flow defines a set of steps to complete a task. For example, the action flow may be to input a new person to a business' database, import a document into the business' database, copy documents, replace a user's forgotten password, or perform other tasks.

Each action flow has a start and a finish. The start defines the first step of the action flow. The finish defines the end of the action flow. As discussed above, the development environment (100) provides a composable mechanism for building a web application design (110). Thus, the set of steps of the action flow are not defined at an individual computer instruction level, such as in a programming language, but rather at the business logic level. Action flows may or may not have user interaction. In particular, an action flow may be completely automatic. By way of an example, an action flow may include a set of steps that are completely performed by a server. In other embodiments, an action flow, an action flow may be steps by which a user is guided using the web application. For example, an action flow may correspond to a wizard that guides the user through performing a function of the web application. In such a scenario, two or more of the action flow may correspond to distinct web pages in the web application. Alternatively or additionally, some of the steps of the action flow may be interfacing with a user while another set of steps may be performed by a server.

The set of steps in an action flow are ordered. In particular, one or more paths may exist through the set of steps, whereby each path is a defined sequence of steps. The particular path may be dependent on the input from the user and/or gathered data.

An action flow fragment is a portion of an action flow in accordance with one or more embodiments of the technology. In other words, whereas an action flow is a set of steps to complete a task that has a start and a finish, an action flow fragment is a subset of steps to perform part of a task and does not have a start and a finish. Further, whereas action flows cannot be incorporated into other action flows, action flow fragments may be incorporated into other action flows. Additionally, an action flow fragment may have more than one initial input control step, whereby execution may pass to any of the more than one initial input control step. Similarly, the action flow fragment may have more than one output control steps, whereby execution may return to the parent using any of the more than one output control step.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a user interface for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The user interface of the builder (156) may include editor features and sub-systems. The editor features may include editors for modifying various aspects or views of the web application design, and/or a builder user interface to assist in the development of the web application design in accordance with one or more embodiments of the technology. For example, the editors may include business objects, documents, cases, searches, reports, pages, roles, apps, widgets, and process editors. The builder user interface may include a new artifact wizard, add-on top-level menu, add-on tool bar buttons, context menus, an artifacts properties page, and a model editor.

A process editor includes functionality to generate a process definition. A process definition is a definition of a business process, which may correspond to a real world business organization's workflow. In other words, the process definition is a set of activities or tasks that are orchestrated based on organization business rules or policies and produce a specific outcome. In one or more embodiments of the technology, tasks in the process definition may be executed by the user or the system by taking some actions on the business data. Execution of the tasks may be sequential and/or parallel. In one or more embodiments, a process definition is in an expression based language and includes logic for executing a process. In one or more embodiments of the technology, the ordering of instructions in a process may not be known until the process is executed.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, and package and deploy the web application. The builder (156) may also include components functionality to perform source control and project/library management.

Figure 2:
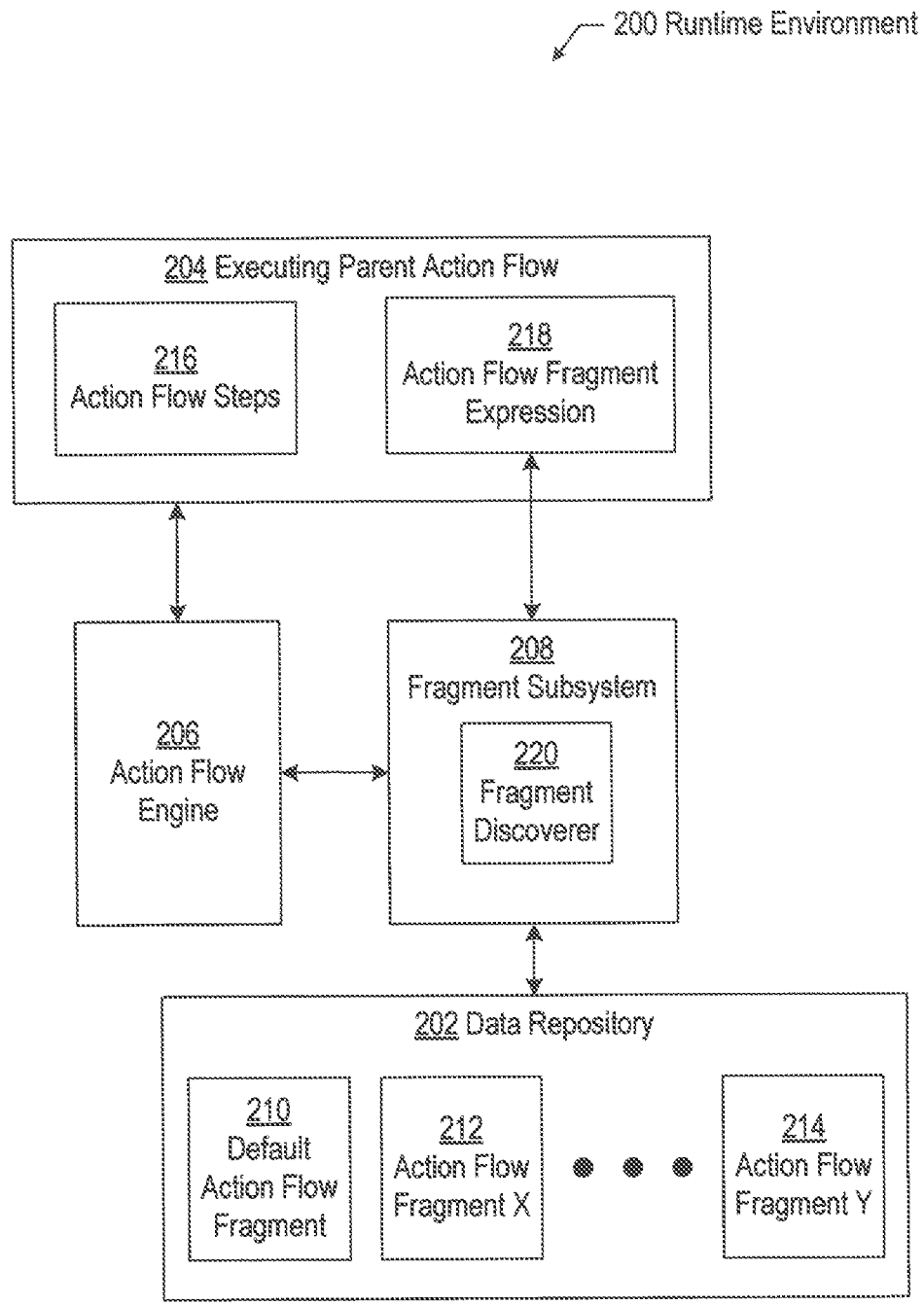

Turning to FIG. 2, FIG. 2 shows a schematic diagram of a runtime environment (200) in accordance with one or more embodiments of the technology. As shown in FIG. 2, the runtime environment (200) includes a data repository (202), an executing parent action flow (204), an action flow engine (206), and a fragment subsystem (208). Each of these components is described below.

In one or more embodiments of the technology, the data repository (202) is any type of storage unit and/or device (e.g., a file system, database, collection of tables, or any other storage mechanism) for storing data. Further, the data repository (202) may include multiple different storage units and/or devices. The multiple different storage units and/or devices may or may not be of the same type or located at the same physical site. In one or more embodiments of the technology, the data repository (202) includes functionality to store multiple action flow fragments (e.g., action flow fragment X (212), action flow fragment Y (214), default action flow fragment (210)) including a default action flow fragment (210). Each action flow fragment is related to a unique identifier of the action flow fragment. The unique identifier may be any alphanumeric, binary, or otherwise symbolic identifier of the action flow fragment.

A default action flow fragment (210) is an action flow fragment that is used when no other action flow fragment applies. In one or more embodiments, a default action flow fragment may be defined as a parameter of the parent action flow, such as in the action flow fragment expression (218) (discussed below). In one or more embodiments, the default action flow fragment may be separate from the parent action flow, or may be part of the parent action flow. In some embodiments, the default action flow fragment is empty. In other words, the default action flow does not include any steps, but rather is to continue executing the parent.

Continuing with FIG. 2, an executing parent action flow (204) is an action flow that incorporates an action flow fragment. In other words, an executing parent action flow references an action flow fragment. The executing parent action flow (204) includes action flow steps (216) and an action flow fragment expression (218). Action flow steps are the steps of an action flow, as discussed above with reference to FIG. 1.

For example, the inline sources may be graphical user interface widgets displayed on one or more pages of the action flow, data items defined within the action flow fragment, and any other source of data.

An action flow fragment expression (218) is an expression for selecting an action flow fragment from the set of action flow fragments (e.g., action flow fragment X (212), action flow fragment Y (214)). In particular, an action flow fragment expression (218) is a function on data from one or more data sources that maps the data to an identifier of an action flow fragment. The action flow fragment expression (218) may include references to one or more data sources and describe one or more operations to perform on data from the one data sources. The data sources may be inline sources (e.g., graphical user interface widgets displayed on one or more pages of the action flow, data items defined within the action flow fragment, and any other source of data), the process or web application context information (e.g., parameter values describing environmental information, such as session identifier, user identifier of a user, identifier of a current instruction being executed, browser information, value of various variables, and any other state information describing the execution environment and execution of the web application), one or more data repositories, or a combination thereof. The output of the action flow fragment expression is an identifier of an action flow fragment.

In one or more embodiments of the technology, the action flow fragment expression may include a loop expression, whereby execution of the action flow fragment repeats until a condition is satisfied. The condition may be, for example, on a result of an expression, action flowed output data from the action flow fragment, a static value, or another condition or a combination thereof.

Continuing with FIG. 2, an action flow engine (206) is operatively connected to the executing parent action flow (204). The connection may be direct or indirect. Further, the action flow engine (206) may be on a local computing device executing a browser that has the executing parent action flow (204). The action flow engine (206) may be hardware, software, firmware, or a combination thereof that includes functionality to manage execution of the executing parent action flow (204). In particular, the action flow engine (206) includes functionality to maintain context information, determine the instructions to perform to execute each step in the action flow, and determine the next step in the action flow.

The action flow engine (206) and the executing parent action flow (204) are also operatively connected to a fragment subsystem. The fragment subsystem (208) may be hardware, software, firmware, or a combination thereof that includes functionality to manage the selection and execution of an action flow fragment based on the action flow fragment expression (218). In particular, the action flow engine may include a fragment discoverer (220) that includes functionality to select the action flow fragment based on the action flow fragment expression (218).

Figure 3:
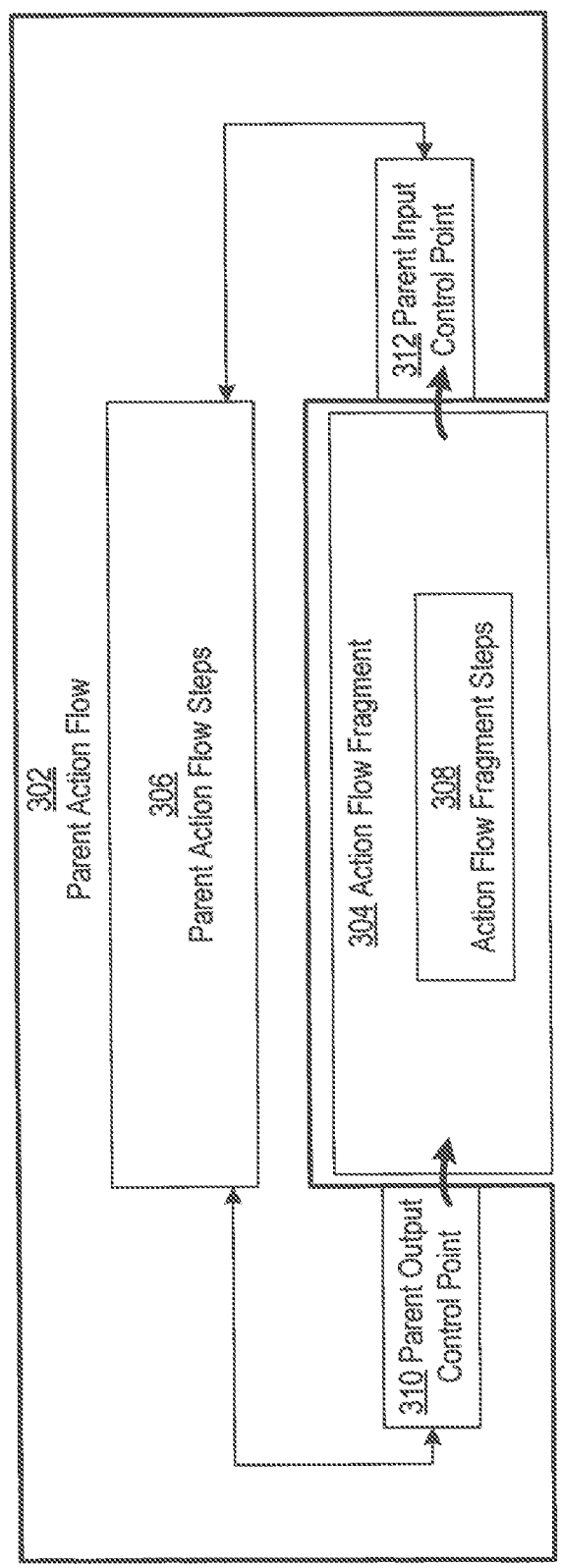

FIG. 3 shows a schematic diagram of a system when a particular action flow fragment is selected in accordance with one or more embodiments of the technology. As shown in FIG. 3, both the parent action flow (302) and the action flow fragment (304) have steps (e.g., parent action flow steps (306), action flow fragment steps (308)). The parent action flow (302) includes at least one parent output control points (310) and parent input control points (312). A parent output control point is step that after performance transfers processing to an action flow fragment (304). The parent action flow may have multiple output control points, which each correspond to separate steps.

A parent input control point (312) corresponds to a step to which processing may be returned from the action flow fragment (304). In other words, when execution of the action flow fragment completes, the execution may return to any of the parent input control points. More particularly, the same instance of an action flow fragment expression in the parent action flow may result in control being returned to any of various parent input control points.

Although not shown in FIG. 3, the action flow fragment includes fragment input control points and fragment output control points. A fragment input control point is an initial step which may start processing from the parent action flow (302). A fragment output control point corresponds to a step that may be the last step executed before control is transferred to the parent.

In one or more embodiments of the technology, a mapping may exist between parent output control points and fragment input control points. Similarly, a mapping may exist between fragment output control points and parent input control points. The mapping may be based, for example, on identical unique part or whole identifiers of the control points, or a table that maps identifiers of output control points to input control points. Other mappings may be used without departing from the scope of the technology. In one or more embodiments of the technology, data structure, input manager, other component, or a combination thereof may maintain and/or perform the mapping. Further, the number of parent output control points may differ from the number of fragment input control points, and the number of fragment output control points may differ from the number of parent input control points.

While FIGS. 1-3 show a configuration of components, other configurations may be used without departing from the scope of the technology. For example, various components may be combined to create a single component. As another example, the functionality performed by a single component may be performed by two or more components.

Figure 4:
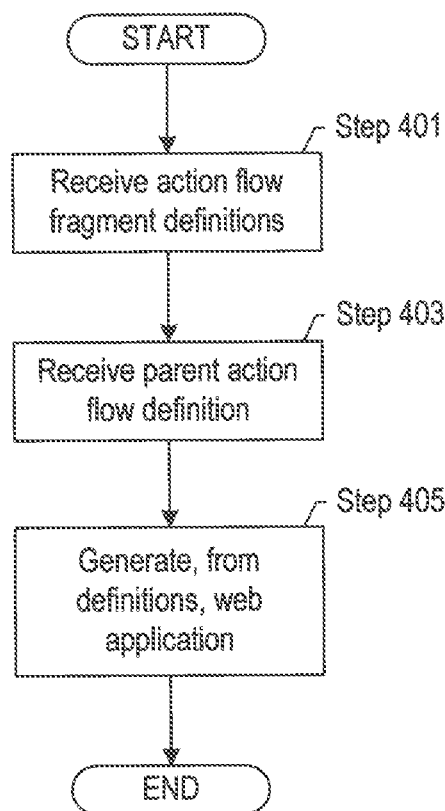
FIGS. 4 and 5 show flowcharts in accordance with one or more embodiments of the technology.
Figure 5:
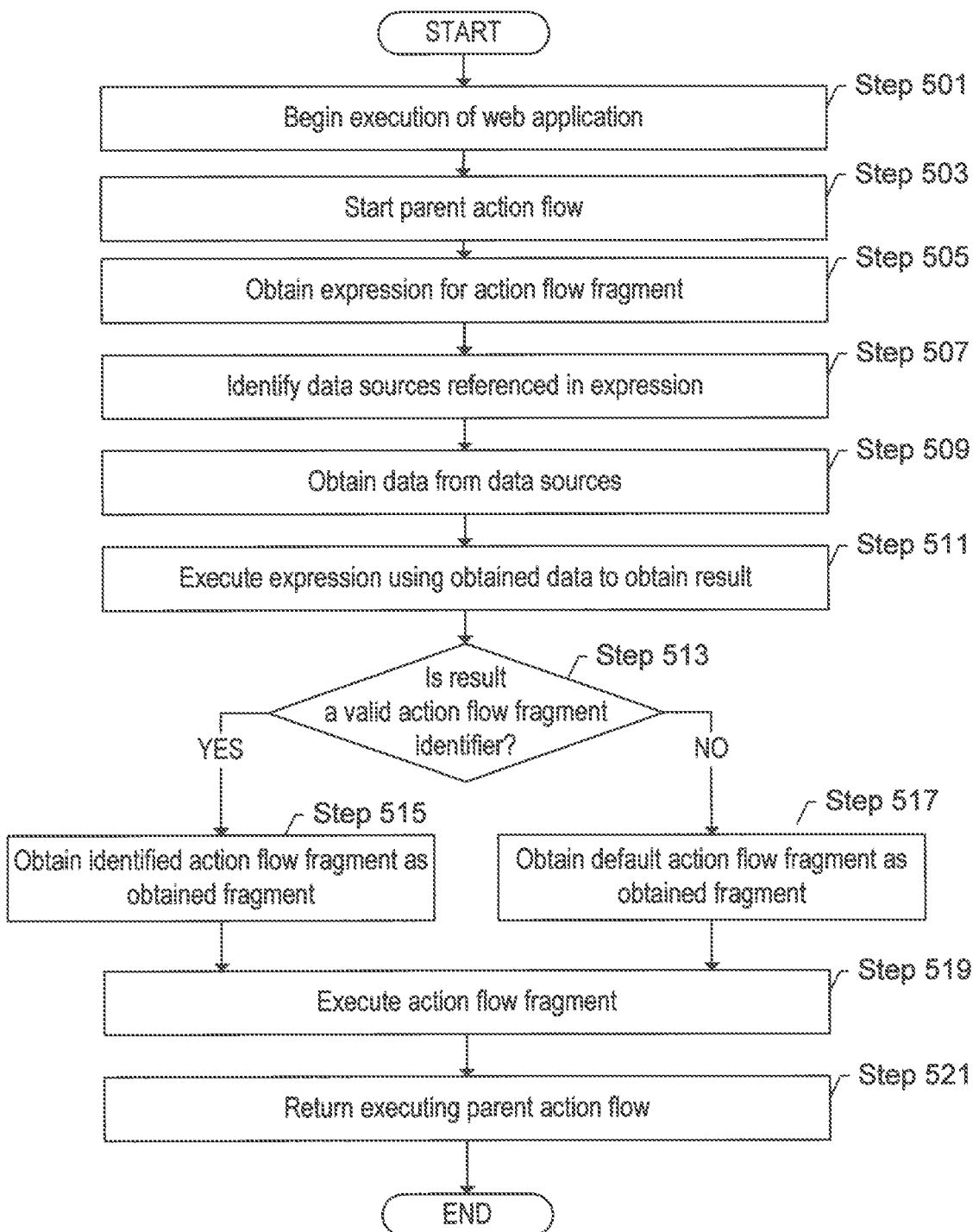

FIGS. 4 and 5 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 4 shows a flowchart for generating a web application design in accordance with one or more embodiments of the technology. In Step 401, one or more action flow fragment definitions are received in accordance with one or more embodiments of the technology. In particular, the development environment shown in FIG. 1 facilitates an expression based development of a web application. Thus, using the developer tools offered by the development environment, a user may drag and drop components into a web application design to define various components of the web application design. Some of the components may have predefined templates and logic. In such a scenario, once dragged into the web application design, the user may submit values of various parameters of the components. For example, the user may submit a unique identifier, any references, or any other information.

For action flows and action flow fragments, some steps of the action flow or action flow fragments have predefined sets of steps and may be represented as a box. Thus, a user may simply drag the step to the web application design, add in a line connector to link the prior step before the dragged step, and a line connector to link the step to be executed after the dragged step. The user may then define one or more web pages for the step, or select web pages for the step.

Within the developer environment, the builder may maintain an internal version of the web application design, such as in extensible markup language (XML) format that describes the web application design.

Thus, receiving the action flow fragment definition may include receiving the developer's input through the graphical user interface of the developer environment and generating the internal version of the web application design while the web application design is being developed. In one or more embodiments of the technology, the developer may generate multiple action flow fragment definitions. Further, in accordance with one or more embodiments of the technology, one or more of the action flow fragment definitions may be copied from other action flows or action flow fragments. For example, the developer may select a portion of an action flow or action flow fragment using the graphical user interface of the developer environment and copy the selection to a new definition. The developer may make any further modifications of the copied action flow fragment definition(s).

In Step 403, one or more parent action flow definitions are received in accordance with one or more embodiments of the technology. Receiving the one or more parent action flow definitions may be performed in a same or similar manner discussed above with reference to Step 401. In particular, the developer may provide the definition through the graphical user interface of the developer environment as discussed above, and the builder may generate the internal version. As part of generating the parent action flow definition, the developer may include an action flow fragment expression. In other words, the developer may include a placeholder in the parent action flow definition for an action flow fragment and specify the action flow fragment expression using an expression based language. Specifying the action flow fragment expression may include defining one or more operations and sources of data for selecting the action flow fragment. The developer may also define a default action flow fragment definition. Steps 401 and 403 may be performed multiple times to create additional parent action flow definitions and action flow fragment definitions. Further, additional steps may be performed to create and receive the web application design.

In Step 405, a web application is generated from the web application design in accordance with one or more embodiments of the technology. In one or more embodiments of the technology, generating the web application includes translating the internal version of the web application into a computer programming language set of instructions. The generation may be based on predefined templates of code for each portion of the web application design. The templates may be ordered according to the web application design and populated with parameters in the web application design.

As shown in FIG. 4, one or more embodiments may allow reuse of portions of action flows through a graphical user interface development environment that uses dragging and dropping of web application components and expression based insertion of parameters. Once the web application is built, the web application may be executed.

FIG. 5 shows a flowchart for executing an action flow of a web application. FIG. 5 may be performed, for example, using the components discussed above with reference to FIG. 2. In Step 501, execution of the web application begins.

For example, a user may log into the business' system and the web application may load into the user's web browser.

In Step 503, an action flow is processed in accordance with one or more embodiments of the technology. In particular, control transfers to a parent action flow which starts processing the steps of the parent action flow. Processing the parent action flow may include interpreting the step, identifying one or more web pages for performing the step, and guiding the user through performing the operations in the web pages. In other words, one or more web pages may be displayed that receives input and/or provides information to the user. The particular web pages may be mapped to the step. Similarly, one or more server instructions may be mapped to each step.

In Step 505, an expression for an action flow fragment is obtained in accordance with one or more embodiments of the technology. In other words, during execution, an action flow fragment expression is obtained as the next step to process.

In Step 507, data sources referenced in the action flow fragment expression are identified in accordance with one or more embodiments of the technology. In one or more embodiments of the technology, the expression may reference inline data sources and/or external data sources.

In Step 509, data is obtained from the one or more data sources according to the action flow fragment expression. For example, the data may be obtained by accessing inline data sources, a data repository to identify user data, the values of action flow context variables, the values of fields within the page, other data source, or a combination thereof.

In Step 511, the expression is executed using the obtained data to obtain a result in accordance with one or more embodiments of the technology. Executing the expression may include performing one or more operations in the expression. For example, the operations may include comparing data from a data source to a value, and selecting an action flow fragment if the data matches. As a result of executing the expression, a result is obtained. The result may be a unique identifier of an existing action flow fragment, a unique identifier of the default action flow fragment, an incorrect identifier, or an error identifier in accordance with one or more embodiments of the technology.

In Step 513, a determination is made whether the result is a valid action flow fragment identifier in accordance with one or more embodiments of the technology. In other words, a determination is made whether the result references a valid action flow fragment.

If the result is a valid action flow fragment identifier, the flow proceeds to Step 515. In Step 515, the identified action flow fragment is obtained as an obtained fragment in accordance with one or more embodiments of the technology. In other words, the action flow fragment corresponding to the action flow fragment identifier is obtained from the data repository.

If the result is not a valid action flow fragment identifier, then the flow proceeds to Step 517. In Step 517, the default action flow fragment is obtained as the obtained action flow fragment. The default action flow fragment may be defined within the parent action flow, in which the default action flow fragment is the next step in the parent action flow that is set as the default. Alternatively, the default action flow fragment may be obtained from the data repository.

Regardless of whether an identified action flow fragment is obtained or the default action flow fragment is obtained, the flow may proceed to Step 519. In Step 519, the action flow fragment starts execution. The execution may be performed by identifying the fragment input control point matching the current parent output control point in accordance with one or more embodiments of the technology. If the match is based on having a unique all or part of the identifier of the parent output control point, then the fragment input control point that has all or part of the identifier is selected. If the match is based on a mapping, then a data structure may be accessed to identify the fragment input control point that maps to the parent output control point. If the match is based on an expression and parameters, then the expression may be executed in a same or similar manner to executing the action flow fragment expression to obtain the unique identifier.

In one or more embodiments of the technology, the action flow fragment is executed using the parent action flow context in accordance with one or more embodiments of the technology. In other words, the action flow fragment steps are processed. Various paths may be taken during the execution of the action flow fragment. Further, the action flow fragment may be processed as if the action flow fragment were a part of the parent action flow. In one or more embodiments of the technology, if the action flow fragment expression includes a loop expression, execution of the action flow fragment repeats until the condition is satisfied. In other words, at each execution of the action flow fragment, a determination is made whether the condition is satisfied. If the condition is not satisfied, then execution of the action flow fragment may repeat. If the condition is satisfied, then the flow may proceed to Step 521.

In Step 521, processing is returned to the parent action flow at the parent action flow input control point matching the fragment output control point. In other words, execution returns to the parent action flow. Because different control paths may be taken during the processing of the action flow fragment, the position in which execution returns may not be known until processing of the action flow fragment completes.

Figure 6:
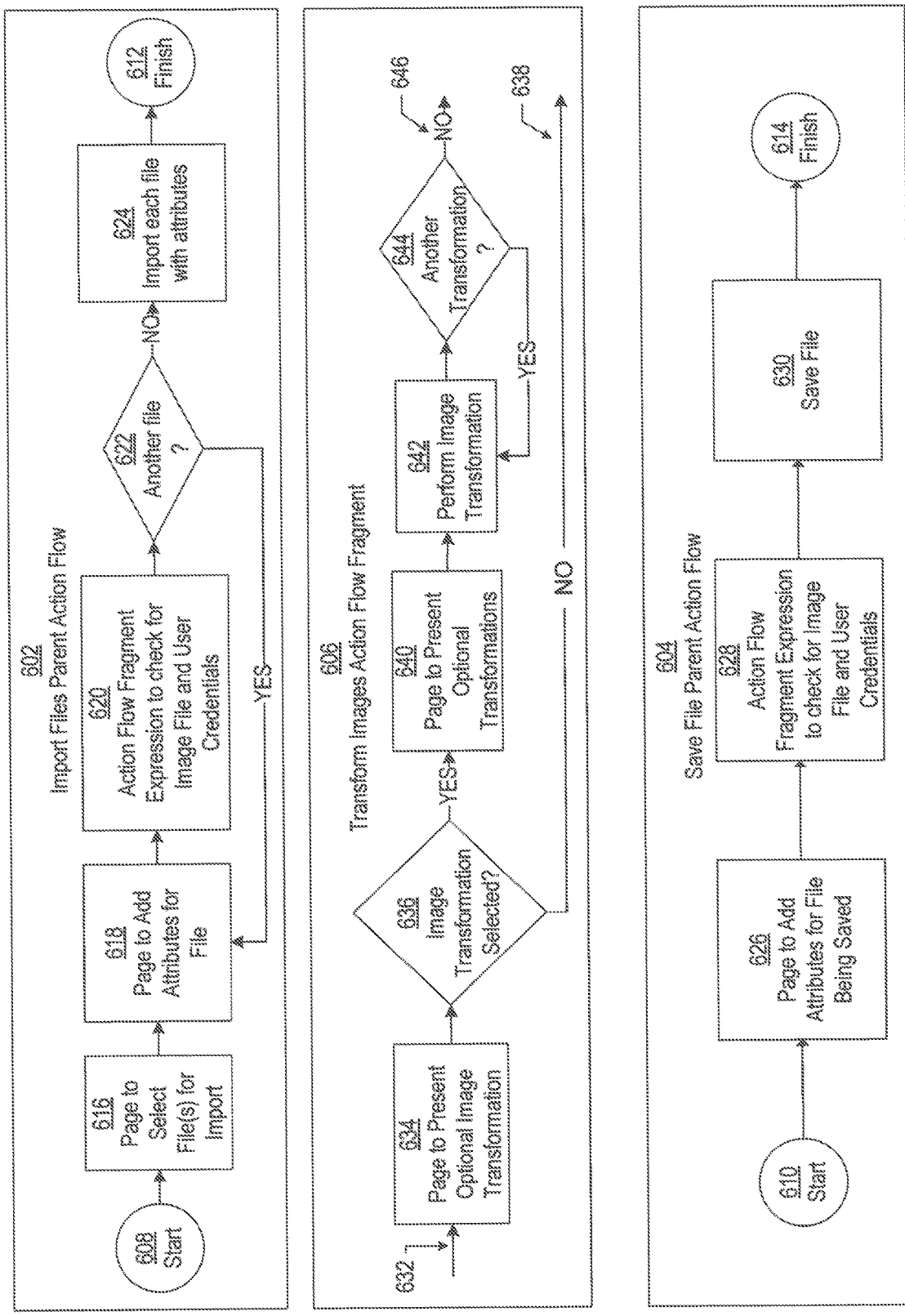
FIG. 6 shows an example in accordance with one or more embodiments of the technology.

FIG. 6 shows an example in accordance with one or more embodiments of the technology. In the example shown in FIG. 6, two action flows (i.e., import files action flow (602), save file action flow (604)) and an action flow fragment (606) are shown. The action flows (i.e., import files action flow (602), save file action flow (604)) each have a defined start (i.e., start (608), start (610)) and a finish (e.g., finish (612), finish (614)).

The import files parent action flow (602) is an action flow for a wizard that guides the user through importing one or more file. In particular, the import files parent action flow includes a step for displaying the page to select the file(s) for importing (616), a step for adding attributes to store with the file in a database (618), a step for performing an action flow fragment expression (620), a step for determining whether another unprocessed file is in the set of selected files (622), and a step for the server to perform the importing (624). The step for displaying the page to select the file(s) for importing (616), and the step for adding attributes to store with the file in a database (618) may correspond to separate and distinct pages or set of pages that are not expressly defined in the step. For example, the pages may be referenced by the steps, such as by an identifier. The step for performing an action flow fragment expression (620) may be defined for the fragment engine to perform on the client or by a server. The step for determining whether another unprocessed file is in the set of selected files (622) and the step for the server to perform the importing (624) may be for the client and/or server to process.

The save file parent action flow (604) is an action flow for a wizard that guides the user to saving a previously selected file to a business database. In particular, the save file parent action flow includes a step for adding attributes to store with the file in a database (626), a step for performing an action flow fragment expression (620), and a step for saving the file. The step for adding attributes to store with the file in a database (626) may correspond to one or more pages that are not expressly defined in the step. For example, the pages may be referenced by the steps, such as by an identifier. The step for performing an action flow fragment expression (620) may be defined for the fragment engine to perform on the client or by a server. The step for the server to perform the saving (630) may be for the client and/or server to process.

As shown in the example, both the import files parent action flow (602), and the save file parent action flow (604) may have an action flow fragment expression. In the example, consider the scenario in which for any image file in which the user has the appropriate credentials, the web application designer wants to give the user the option to transform the image into different sizes and file formats, such as for publishing purposes, when the image file is stored in the business database.

Rather than separately including the image transformation steps in the import files parent action flow (602) and the save file parent action flow (604), the two action flows each have a step for executing an action flow fragment expression to check for the image file and user credentials. In particular, execution of the expression determines whether the current file is an image file, accesses the context information to obtain the user identity, accesses the server to obtain the credentials for the user identity, and, if the user is authorized and the file is an image file, directs processing to the transform image action flow fragment (606). If the user is not authorized or the file is not an image file, the expression defaults to continuing the parent processing.

The transform images action flow fragment (606) has input control point (632). From the input control point, the transform images action flow fragment (606) has a step for displaying a page to present the option to perform image transformations (634), a step for determining whether an image transformation is selected (636), an output control point (638) for when an image transformation is not selected, a step to display a page to present and receive selections of optional transformations (640), a step to perform a selected image transformation (642), a step to determine whether another transformation is selected (644) which returns execution to the prior step (642) or to an output control point when execution completes (646). Thus, the transform images action flow fragment (606) may be incorporated at runtime into any of the parent action flows that store image files into the business database. As shown in the example, one or more embodiments provide for a higher level of reuse than program instructions. Rather, one or more embodiments allow for reuse of entire portions of a web application design, by allowing for using action flow fragments in multiple action flows.

Figure 7:
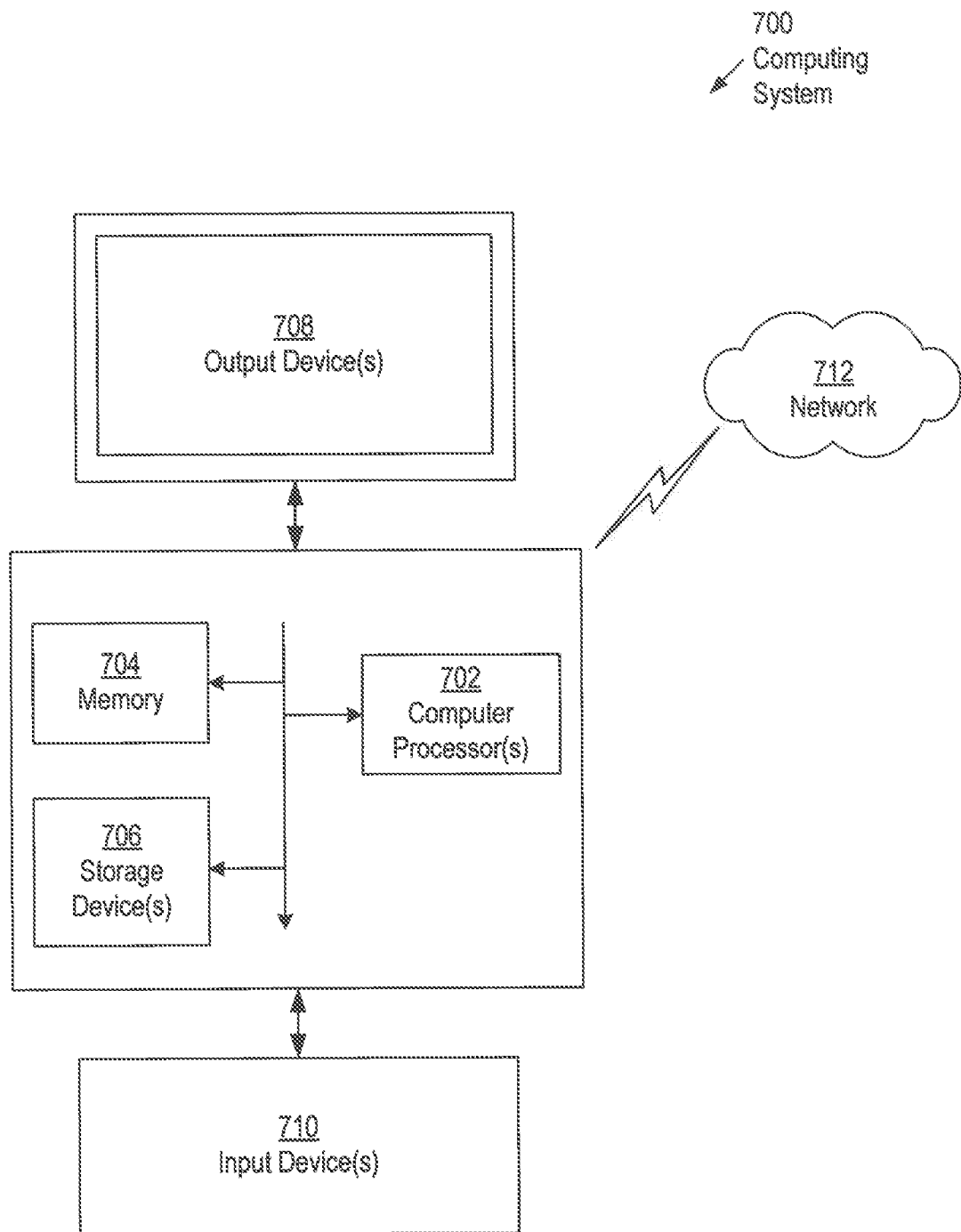
FIG. 7 shows a computing system in accordance with one or more embodiments of the technology.

Embodiments of the technology may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor (s) (702) may be an integrated circuit for processing instructions. For example, the computer processor(s) may be one or more cores, or micro-cores of a processor. The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the technology.

Further, one or more elements of the aforementioned computing system (700) may be located at a remote location and connected to the other elements over a network (712). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A system for action flow fragment management comprising:
a computer processor; and
memory comprising instructions for a fragment subsystem that, when executed on the computer processor:
execute a first parent action flow comprising a first plurality of steps which correspond to distinct pages of a web application;
obtain, during execution of the first parent action flow, a first action flow fragment expression comprising a function;
execute the first action flow fragment expression using first data gathered from a first data source to obtain, as output from the first action flow fragment expression, a first action flow fragment identifier identifying a first action flow fragment;
select, from a plurality of action flow fragments stored in a data repository, the first action flow fragment;
execute the first action flow fragment; and
return execution to the first parent action flow when execution of the first action flow fragment completes.

2. The system of claim 1, wherein the instructions for the fragment subsystem, when executed on the computer processor, further identify the first data source in expression and obtain first data from the identified first data source.

3. The system of claim 1, wherein the first action flow fragment is reusable in a plurality of different action flows.

4. The system of claim 1, wherein executing the first action flow fragment expression comprises determining based on the first data whether the first action flow fragment is an invalid action flow fragment, and in response to determining that the first action flow fragment is an invalid action flow fragment, executing a default action flow fragment in place of the first action flow fragment.

5. The system of claim 1, wherein the instructions for the fragment subsystem, when executed on the computer processor, further execute the first action flow fragment expression using second data gathered from a second data source to obtain a second action flow fragment identifier, select a second action flow fragment corresponding to the second action flow fragment identifier from the plurality of action flow fragments, and execute the second action flow fragment.

6. The system of claim 1, wherein the instructions for the fragment subsystem, when executed on the computer processor, further gather the first data from an internal source within the first parent action flow, wherein executing the first action flow fragment expression uses the first data from the internal source.

7. A non-transitory computer readable medium for action flow fragment management comprising computer readable program code for:
executing a first parent action flow comprising a first plurality of steps which correspond to distinct pages of a web application;
obtaining, during execution of the first parent action flow, a first action flow fragment expression comprising a function;
executing the first action flow fragment expression using first data gathered from a first data source to obtain, as output from the first action flow fragment expression, a first action flow fragment identifier identifying a first action flow fragment;
selecting, from a plurality of action flow fragments stored in a fragment store, the first action flow fragment;
executing the first action flow fragment; and
returning execution to the first parent action flow when execution of the first action flow fragment completes.

8. The non-transitory computer readable medium of claim 7, the computer readable program code further identifying the first data source in expression and obtain first data from the identified first data source.

9. The non-transitory computer readable medium of claim 7, wherein the first action flow fragment is reusable in a plurality of different action flows.

10. The non-transitory computer readable medium of claim 7, wherein executing the first action flow fragment expression comprises determining based on the first data whether the first action flow fragment is an invalid action flow fragment, and in response to determining that the first action flow fragment is an invalid action flow fragment, executing a default action flow fragment in place of the first action flow fragment.

11. The non-transitory computer readable medium of claim 7, the computer readable program code further executing the first action flow fragment expression using second data gathered from a second data source to obtain a second action flow fragment identifier, selecting a second action flow fragment corresponding to the second action flow fragment identifier from the plurality of action flow fragments, and executing the second action flow fragment.

12. The non-transitory computer readable medium of claim 7, the computer readable program code further gathering the first data from an internal source within the first parent action flow, wherein executing the first action flow fragment expression uses the first data from the internal source.

13. A method for action flow fragment management comprising:
   executing a first parent action flow comprising a first plurality of steps which correspond to distinct pages of a web application;
   obtaining, during execution of the first parent action flow, a first action flow fragment expression comprising a function;
   executing the first action flow fragment expression using first data gathered from a first data source to obtain, as output from the first action flow fragment expression, a first action flow fragment identifier identifying a first action flow fragment;
   selecting, from a plurality of action flow fragments stored in a fragment store, the first action flow fragment;
   executing the first action flow fragment; and
   returning execution to the first parent action flow when execution of the first action flow fragment completes.

14. The method of claim 13, further comprising identifying the first data source in expression and obtain first data from the identified first data source.

15. The method of claim 13, wherein the first action flow fragment is reusable in a plurality of different action flows.

16. The method of claim 13, wherein executing the first action flow fragment expression comprises determining based on the first data whether the first action flow fragment is an invalid action flow fragment, and in response to determining that the first action flow fragment is an invalid action flow fragment, executing a default action flow fragment in place of the first action flow fragment.

17. The method of claim 13, further comprising executing the first action flow fragment expression using second data gathered from a second data source to obtain a second action flow fragment identifier, selecting a second action flow fragment corresponding to the second action flow fragment identifier from the plurality of action flow fragments, and executing the second action flow fragment.

18. The method of claim 13, further comprising gathering the first data from an internal source within the first parent action flow, wherein executing the first action flow fragment expression uses the first data from the internal source.

* * * * *